United States Patent
Harris et al.

(10) Patent No.: US 12,126,669 B2
(45) Date of Patent: Oct. 22, 2024

(54) PERSONALIZED DYNAMIC VIDEO OVERLAY IN AN ONLINE MEDIA PLAYER

(71) Applicant: Ossum Technology Inc., New York, NY (US)

(72) Inventors: DeVon Lamar Harris, New York, NY (US); Peter Thomas Gerard, Garrison, NY (US)

(73) Assignee: Ossum Technology Inc., New York, NY (US)

( * ) Notice: Subject to any disclaimer, the term of this patent is extended or adjusted under 35 U.S.C. 154(b) by 0 days.

(21) Appl. No.: 18/065,521

(22) Filed: Dec. 13, 2022

(65) Prior Publication Data

US 2024/0196043 A1    Jun. 13, 2024

(51) Int. Cl.
*H04L 67/02* (2022.01)
*H04L 65/61* (2022.01)
*H04N 21/431* (2011.01)

(52) U.S. Cl.
CPC .............. *H04L 67/02* (2013.01); *H04L 65/61* (2022.05); *H04N 21/4312* (2013.01)

(58) Field of Classification Search
CPC ... H04L 65/61; H04L 67/02; H04L 21/26258; H04L 21/2668; H04L 21/431; H04L 21/4312; H04L 21/4316; H04L 21/472; H04L 21/47205; H04L 21/4722
See application file for complete search history.

(56) References Cited

U.S. PATENT DOCUMENTS

| | | | |
|---|---|---|---|
| 11,145,306 B1 * | 10/2021 | Harris | G06F 3/0482 |
| 2007/0038931 A1 * | 2/2007 | Allaire | H04N 21/4316 |
| | | | 715/208 |
| 2009/0024927 A1 * | 1/2009 | Schrock | H04N 21/4312 |
| | | | 715/722 |
| 2011/0166918 A1 * | 7/2011 | Allaire | H04N 21/4312 |
| | | | 705/14.69 |
| 2011/0271325 A1 * | 11/2011 | Tiu, Jr. | H04L 65/40 |
| | | | 726/3 |
| 2011/0305433 A1 * | 12/2011 | Singer | H04N 21/2668 |
| | | | 386/290 |
| 2012/0139940 A1 * | 6/2012 | Chavanne | G06F 16/95 |
| | | | 345/629 |

(Continued)

*Primary Examiner* — Vivek Srivastava
*Assistant Examiner* — William C McBeth
(74) *Attorney, Agent, or Firm* — AMSEL IP LAW PLLC; Jason Amsel

(57) ABSTRACT

A media system enables creation, editing, and presentation of a media experience with dynamically generated personalized content. An editor application enables creation of media content based on a set of media objects and a configuration file that controls the timing and positioning of the media objects. At least some of the media objects may be presented conditionally based on user interactions or dynamic data sources that map variables associated with the customizable objects to specific values when a media player loads the media experience. The mapping rules may derive the values from various data sources to enable the media experience to be customized to the publisher, to the viewer, based on external events, or other dynamic data. At least some dynamic objects may be presented as overlays on an underlying video in a manner that seamlessly combines the dynamic objects with static media.

19 Claims, 10 Drawing Sheets

(56) References Cited

U.S. PATENT DOCUMENTS

| | | | |
|---|---|---|---|
| 2013/0238757 A1* | 9/2013 | Cho | H04L 65/1089 |
| | | | 709/218 |
| 2016/0275093 A1* | 9/2016 | Majoch | G06F 40/166 |
| 2018/0376209 A1* | 12/2018 | Ramey | H04N 21/472 |
| 2021/0185378 A1* | 6/2021 | Rajendran | H04N 21/2668 |
| 2021/0248626 A1* | 8/2021 | Penberthy | G06Q 30/0275 |

* cited by examiner

PERSONALIZED DYNAMIC VIDEO OVERLAY IN AN ONLINE MEDIA PLAYER

BACKGROUND

Technical Field

This disclosure relates generally to an interactive media system, and more specifically, to an interactive media system that dynamically generates personalized media content.

Description of the Related Art

Traditional online media players present static downloadable or streaming content. Such traditional players are limited in their ability to provide customized user experiences. As a result, publishers are unable to tailor content to specific users in a manner that is easily definable by the publisher and that appears seamless to the user.

BRIEF DESCRIPTIONS OF THE DRAWINGS

The disclosed embodiments have other advantages and features which will be more readily apparent from the following detailed description and the appended claims, when taken in conjunction with the accompanying drawings, in which:

Figure (or "FIG.") 1 illustrates a block diagram of an example embodiment of a media system.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

A media system enables creation, editing, and presentation of a media experience with dynamically generated and personalized content. An editor application enables a creator to create media content based on a set of media objects and a configuration file that controls the timing and positioning of the media objects. At least some of the media objects may be presented conditionally based on user interactions or dynamic data sources. The customizable objects may be configured based on mapping rules set by a publisher that link variables associated with the customizable objects to customizable values. The mapping rules may derive the values from various data sources to enable the media experience to be customized to the publisher, to the viewer, based on external events, or other dynamic data. At least some dynamic objects may be presented as overlays on an underlying video in a manner that seamlessly combines the dynamic objects with static media. The editor application may furthermore generate a customizable embed code associated with the configuration file to enable embedding of a media player for presenting the media experience on a website.

Figure 1:
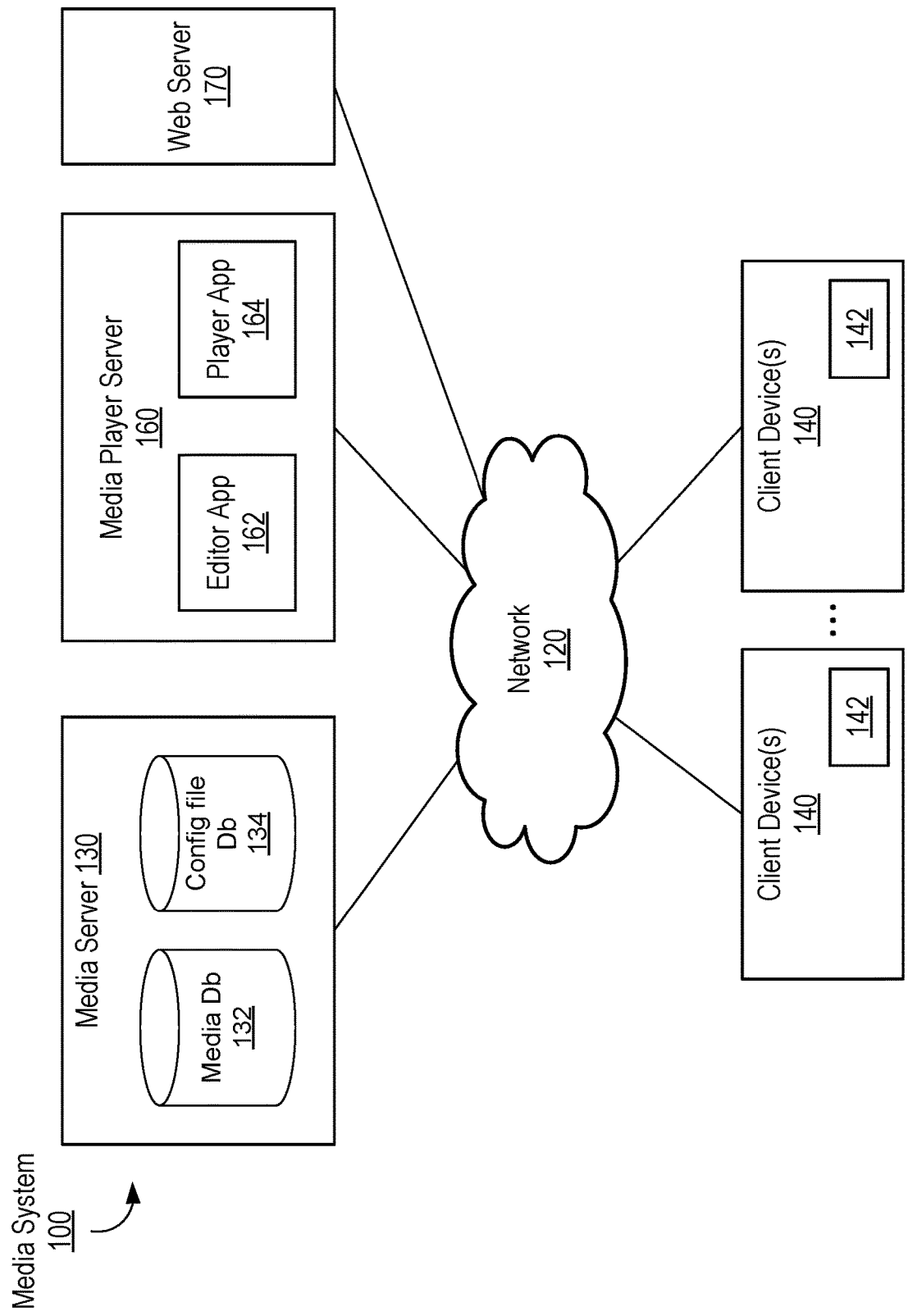

FIG. 1 is a block diagram of a media system 100 according to one embodiment. The media system 100 includes a network 120, a media server 130, a media player server 160, a web server 170, and one or more client devices 140. In alternative configurations, different and/or additional components may be included in the media system 100.

The client device 140 comprises a computer device for creating, editing, and/or viewing media content. The client device 140 includes a browser 142 that enables access to the media player server 160, media server 130, and/or web server 170. In other embodiments, the client 140 may access one or more servers 130, 160, 170 via an installed application that is not necessarily a web browser. The client device 140 includes input devices (such as a touchscreen, keyboard, mouse, joystick, microphone, camera, etc.) for receiving various inputs associated with the creating, editing, and/or viewing media content and one or more output devices (such as a display, speaker, haptic device, etc.) for generating outputs associated with creating, editing, and/or viewing media content. The client devices 140 may each comprise one or more processors and a non-transitory computer-readable storage medium storing instructions associated with the browser 142 for carrying out the functions described herein.

The web server 170 hosts one or more websites accessible to the client devices 140 via the network 120. The website may be embodied as source code that is provided to the browser 142 of the client device 140 upon accessing the web server 170 and that includes instructions interpretable by the browser 142 for rendering the website at the client device 140. The website may include, via the source code, an embedded media player that enables presentation of a media experience on the client device 140 when the client device 140 accesses the website.

The media player server 160 interacts with the web server 170 and/or the client device 140 to facilitate creation, editing, and presentation of a media experience. The media player server 160 may include an editor application 162 and a media player application 164. The editor application 162, when accessed by a client device 140, enables creation and/or editing of a media experience. The media experience may comprise various media objects such as video, images, audio, interactive graphics, web links, or other computer-presentable objects presented in accordance with a presentation structure defined by a configuration file. The configuration file may define the timing and positioning of different media objects. Furthermore, the configuration file may define branches or conditional logic that may conditionally control presentation of different media objects dependent on specified criteria. The configuration file may additionally define timing a presentation of various computer-executable actions that may be initiated as part of the media experience such as, for example, redirecting a web browser to a web page at a specified network address, making a phone call, sending a text message, sending data to a predefined network address, opening or closing an application on the client device 140, etc. The configuration file may specify a manner in which media objects are presented including layering of media objects. For example, a media experience may include an overlay of images, text, animations on an underlying video or other media object.

Some of the media objects included in the media experience may be static objects that are directly specified in the configuration file. Other media objects may be dynamic objects that can be referenced as variables in the configuration file upon creation of the media experience, and which may be replaced with specific content at run-time based on various dynamic data. Inclusion of dynamic objects in the media experience enables a media experience that can be personalized to the viewer and/or the publisher. The editor application 162 may configure the dynamic objects so that they are instantiated at run-time based on data received from the web server 170 hosting the website with the embedded player, or from a client device 140 viewing the media experience. For example, dynamic objects may be branded in association with the publisher of the website, may be customized to the viewer of the media experience, and/or may be responsive to real-time interactions of the viewer with the media experience. Thus, the editor application 162 enables creation of media experiences that may result in different presentations when hosted on different websites, when viewed by different viewers, when interacted with in different ways, or when other dynamic factors are varied.

The editor application 142 may be utilized to create media experiences that includes seamless transitions between media objects and may mimic real-world interactions. For example, in a video-based media experience, the media experience may seamlessly transition between video segments to provide the appearance of a continuous video stream. Furthermore, dynamic overlays may be presented such that dynamically inserted overlay objects may appear to the viewer as being part of the underlying video. For interactive components, video may continue to be presented while waiting for the viewer to provide an input so as to provide the viewer with a realistic experience. For example, an interactive media experience may comprise a video tour through a virtual store in which the user can interact with articles in the store. Images and/or text information relating to the articles could be dynamically inserted based on current inventory, current pricing, current promotions, user-specific preferences, or other dynamic factors. In response to interactions with articles (e.g., based on voice requests, gestures, or manual clicks), the video may transition to other video segments that provide more information about the articles. These transitions may occur in a seamless manner that simulates a customer's experience and interactions in a store such as picking up an object, looking at an information display, etc.

In an embodiment, the media experience may include specific prompts for interactions that may be presented as visual elements overlaid or otherwise embedded in the media content. For example, the media experience may include presentation visual elements that can be selected (via a user input device or voice input) to cause an action associated with the selection. Such visual elements may comprise, for example, selectable graphic files (which may be transparent or semi-transparent) that may be overlaid on other media content (e.g., a video). In other embodiments, a prompt for a user interaction may be presented via an audio prompt, or via a combination of audio and visual elements. Interactions with the media content may be made through a user input device (e.g., a mouse, a keyboard, a touchscreen, etc.), through voice input, through gesture input, or through any other control mechanism.

In other embodiments, the interactive media content may take a specified action in response to dynamic data without necessarily presenting an explicit prompt for the interaction. For example, the interactive media experience may be configured to take a predefined action based on dynamic data from various data sources such as web cookies, user profiles, or public data sources.

The configuration file generated by the editor application 162 may comprise, for example, a JSON file, an XML file, a flat file, a YAML file, a binary format file, or other file. Instructions of the configuration file may include, for example, an instruction to play a specified video segment available at a specified network location, an instruction to display a specified image, an instruction to play a specified audio clip, an instruction to display text or a web link, or an instruction to present another object. These instructions may include instructions for presenting images, animations, video, text, or other objects as overlays on an underlying video. Furthermore, the instructions of the configuration file may control the timing of presentation of different media objects, a manner of presentation of different objects, a timing of prompts for user inputs, and actions to be taken in response to different inputs or other dynamic data. In some cases, the configuration file may specify multiple different actions that could be taken based on dynamic data, depending on the content of the data.

The media editor application 162 may be implemented using a graphical user interface that enables a user to create and place objects (e.g., video segments, audio clips, images, text, animations, etc.) on a timeline that controls timing of presentation of each object. Furthermore, the media editor application 162 enables creation of associations between the objects that specifies a desired flow between presentation of the different objects (e.g., following presentation of a first video segment, play a second video segment). To enable dynamic components, the media editor application 162 enables creation of a dynamic operator that may specify content to include in the media experience (and the manner for presenting it) based on one or more dynamic data sources. After designing the media experience, the editor application 162 may compile the media experience created in the graphical interface into a configuration file. Alternatively, the media editor application 162 may enable direct editing of the configuration file using a text-based editor.

After creating a media experience defined by a configuration file, the editor application 162 may store the configuration file to a configuration file database 134 on the media server 130 to enable streaming. Furthermore, the editor application 162 may access an existing configuration file and further edit the configuration file to update the associated media experience. Upon loading an existing configuration file, the editor application 162 may regenerate the graphical user interface corresponding to the presentation structure to enable the user to complete further edits and recompile the configuration file. Examples of an editor application 162 are described in further detail below.

The media player application 164 facilitates a media experience viewable on the client device 140. In operation, the media player application 164 reads the configuration file and executes the instructions to render the media experience. Executing the media experience may include streaming media content from the media database 132 of the media server 130 to the client device 140 in accordance with the structure specified in the configuration file.

In the illustrated embodiment, the media player application 142 and the editor application 162 comprise web-based applications that are stored on the media player server 160 and are loaded in a browser 142 upon the client device 140 accessing the media player server 160. Here, the media player application 164 may be embedded in a website via an embed code in the source file of the website that references the player application 164 and directly or indirectly references the configuration file for the media experience. Upon executing the embed code obtained from the web server 170, the browser 142 accesses the media player server 160, loads the media player application 164, and loads the media experience in accordance with the associated configuration file. The embed code may be shared (e.g., via a social network, ad network distribution using a VPAID protocol, etc.) to enable embedding of the media player application 164 with the same dynamic presentation capability to be employed wherever the media player application 164 is shared.

In an alternative embodiment, the editor application 162 and/or the player application 164 may execute as a local application installed on a client device 142. In other embodiments, different elements of the editor application 162 and/or the player application 164 may execute in part on the client device 140 and in part on the media player server 160.

The media server 130 comprises one or more computing devices or an application executing on one or more computing devices accessible by one or more client devices 140 via the network 120. The media server 130 includes a media database 132 and a configuration file database 134. The media database 132 includes a plurality of objects such as video segments, images, audio clips, web links, text, or other objects that may be incorporated into an interactive media experience as described above. The configuration file database 134 stores the configuration files (created using the editor application 162) that each control presentation of an interactive media experience as described above. Although FIG. 1 illustrates a media database 132 and configuration file database 134 at a single media server 130, embodiments may include multiple distributed media databases 132 that store media objects at various distributed locations not necessarily under control of the media server 130.

The network 120 may include any combination of local area and/or wide area networks, using both wired and/or wireless communication systems. In one embodiment, the network 120 uses standard communications technologies and/or protocols. In some embodiments, all or some of the communication links of the network 120 may be encrypted using any suitable technique.

Various components of the media system 100 of FIG. 1 such as the media server 130, media player server 160, web server 170, and the client devices 140 can each include one or more processors and a non-transitory computer-readable storage medium storing instructions therein that executed cause the one or more processors to carry out the functions attributed to the respective components described herein.

Figure 2:
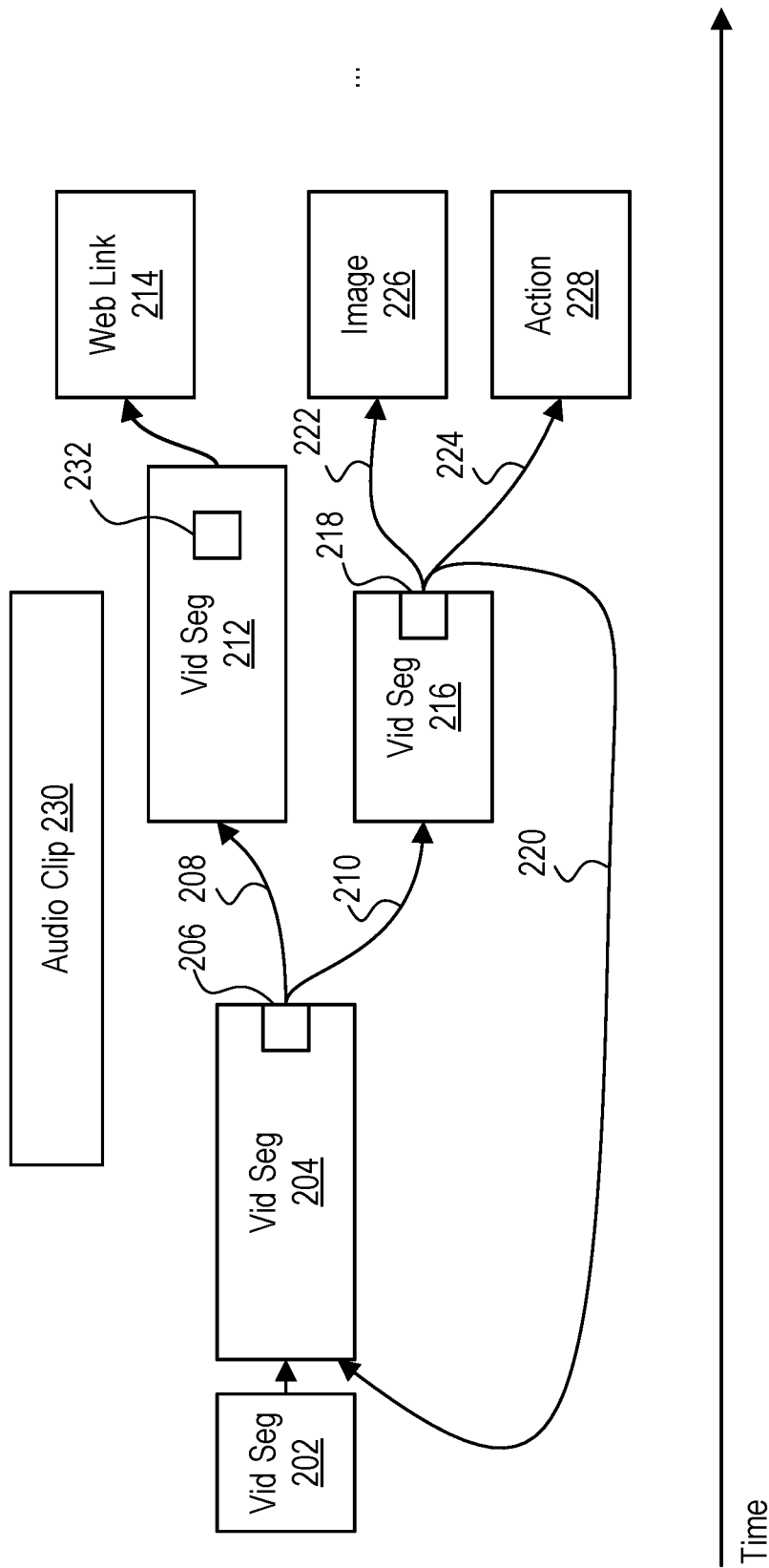
FIG. 2 is a diagram illustrating a presentation structure of an media experience that can be generated by an media editor application using a graphical user interface.

FIG. 2 illustrates an example structure for a media experience that may be created using the media editor application 162 and played using the media player application 164. In the illustrated example, the media experience is designed to include a first video segment 202 followed by a second video segment 204. Partway into the second video segment 204, an audio clip 230 begins playing. The second video segment 204 includes a branch operator 206 that controls whether the media experience next proceeds to a video segment 212 (via branch 208) or a video segment 216 (via branch 210). The branch operator 206 may comprise, for example, a user prompt for an interaction (e.g., selection of control element, voice input, text input, or other user input) that associated a first response with the first branch 208 and a second response with the second branch 210. The prompt may include, for example, selectable text or a graphic overlaid on video content corresponding to the different expected values and/or may include an audio prompt. Alternatively, the branch operator 206 may evaluate other dynamic data such as data from a user profile associated with the viewer or data from a public data source. The branch operator 206 may then evaluate the data to determine which branch 208, 210 to take. For example, the branch operator 206 may take a first branch 208 if, based on user profile data, the user is under 40 years old or of unknown age, and otherwise take the second branch 210.

If the first branch 208 is taken, the video segment 212 next plays followed by presentation of a web link 214. In this example, dynamic content 232 (e.g., text, image, animation, etc.) is provided as an overlay on the video segment 212. The dynamic content 232 may be dynamically selected based on various dynamic data. For example, the dynamic content 232 may be customized to the viewer by selecting the content for display based on one or more viewer-specific parameters. Alternatively, the dynamic content 232 may be dynamically selected based on other data sources that is not necessarily specific to the viewer. In one embodiment, dynamic content 232 may be selected based on dynamic data obtained from a host of the media experience. For example, if the media experience is hosted by an e-commerce web site, dynamic content 232 may be obtained based on a lookup in an inventory management system. In further embodiments, dynamic content 232 may be selected based on dynamic data from a public data source (e.g., based on the current date and/or time).

If the branch 210 is instead taken, the video segment 216 plays which includes another branch operator 218 that determines whether to take branch 222, 224, or 220 depending on a user interaction or other dynamic data. If the branch 222 is taken, the media experience proceeds to display an image 226. If the branch 224 is taken, the media experience proceeds to execute a predefined action 228. The action may comprise, for example, transmitting a data set to a predefined data server, redirecting the video player to a website, executing a purchase transaction, or other programmable web-based action. If the branch 220 is taken, the media experience loops back to video segment 204.

In an embodiment, the media editor application 162 may include a graphical user interface similar to FIG. 2 to enable creation of media experiences. For example, the user interface may enable a user to create visual elements corresponding to objects 202, 204, 212, 214, 216, 226, 228, 230 and place them in desired locations within the graphical user interface corresponding to intended playback timing. Playback order can furthermore be controlled by creating links between objects (shown as arrows in FIG. 2) that indicate the desired flow from one object to another. Additionally, the graphical user interface may be used to insert visual elements corresponding to branch operators 206, 218 and associate different possible values from dynamic data (e.g., user interactions or data from other data sources) with different possible branches 208, 210, 220, 222, 224. Upon designing a media experience, a compiler of the media editor application 144 may generate a configuration file that may be executed by an media player application 164 to enable the interactive media experience, as described above.

Figure 3:
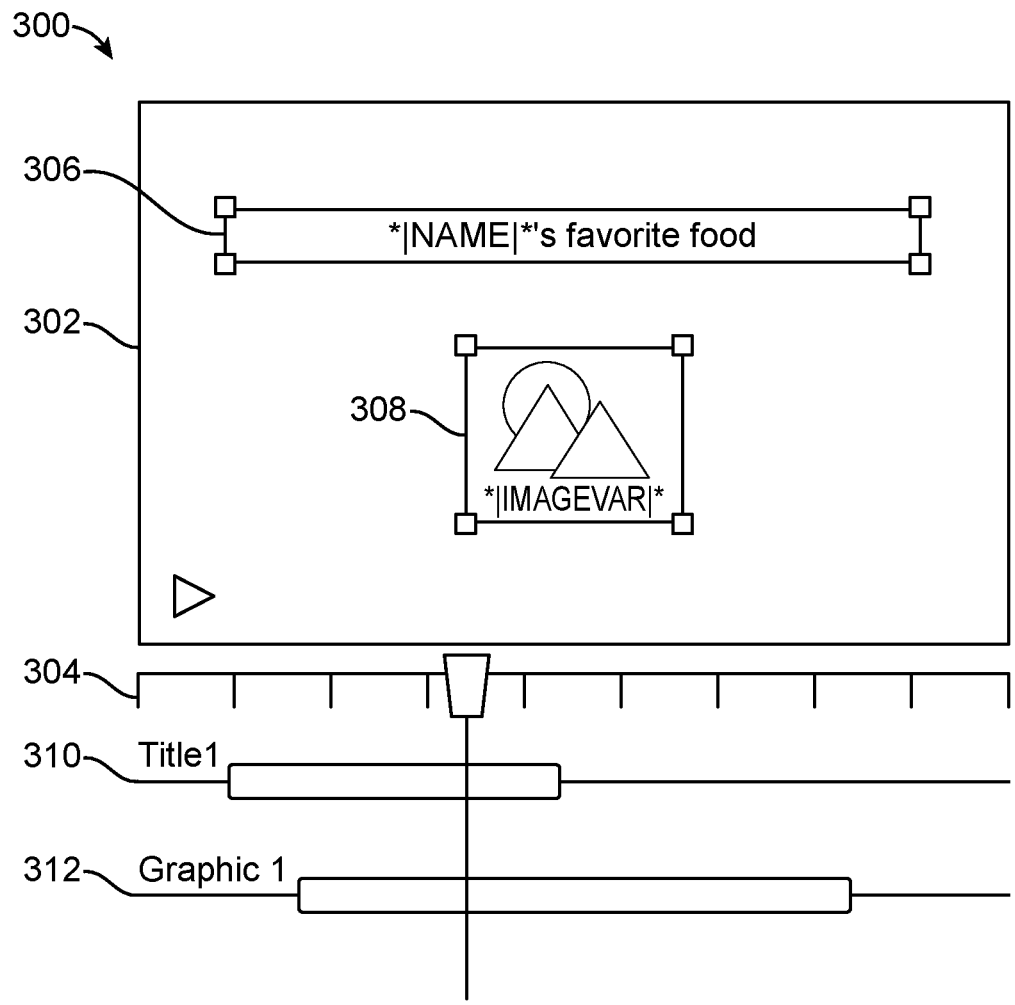
FIG. 3 is an example embodiment of an interface screen for generating a media experience with dynamic overlays.

FIG. 3 is an example interface screen 300 for a media editor application 162 associated with creating a media experience with customized dynamic overlay objects. In this interface screen 300, the media editor application 162 includes a video object 302 and a timeline 304 associated with the video object 302. A dynamic text overlay object 306 includes creator-defined text for overlaying on the video object 302. The creator can specify parameters such as the location, size, font, color, etc. associated with the dynamic text overlay object 306 using graphical control inputs such as drag-and-drop, textbox resizing, etc. The dynamic text overlay object 306 can include fixed text specified by the creator and/or one or more text variables that is populated at run-time. In this example, the text variable ("NAME") is identified using a *| notation in which the variable name is included between an opening identifier *| and closing identifier| *. This specifies that at run-time, the media player application 164 will replace the text variable "NAME" with a value assigned to that variable (which may be obtained from a web cookie or other dynamic data source specified by the web server 170 hosting the player application 164).

The interface screen 300 also includes a dynamic image overlay 308 which may similarly have editor-defined parameters (location, size, border, etc.) that may be configured using graphical interface tools. In this example, the source of the image is an image variable ("IMAGEVAR"). Thus, at run-time, the media player application 164 will load an image based on a value (e.g., a uniform resource locator) assigned to the variable ("IMAGEVAR").

The interface screen 300 also includes graphical timing elements 310, 312 that respectively control the relative timing of presentation of the dynamic overlay elements 306, 308. The editor can use the respective slider controls 310, 312 to adjust the start and end times of each overlay element 306, 308 relative to the underlying video object 302.

Figure 4:
FIG. 4 is an example embodiment of an interface screen for setting custom variables for a media experience with dynamic overlays.

FIG. 4 is an example interface associated with creating variables that can be used to create dynamic elements in a media experience. The interface enables the editor to create variable names 402 (e.g., "NAME", "IMAGE"), specify the type 404 of object for associating with the variable (e.g., text, image, video, animation, etc.), and specify a default value 406 for the variable. Here, the default value 406 may be assigned to the variable when a parameter for assigning to the variable is not available from a dynamic data source at run-time. An "add variable" button 408 enables creation of additional variable names.

Figure 5:
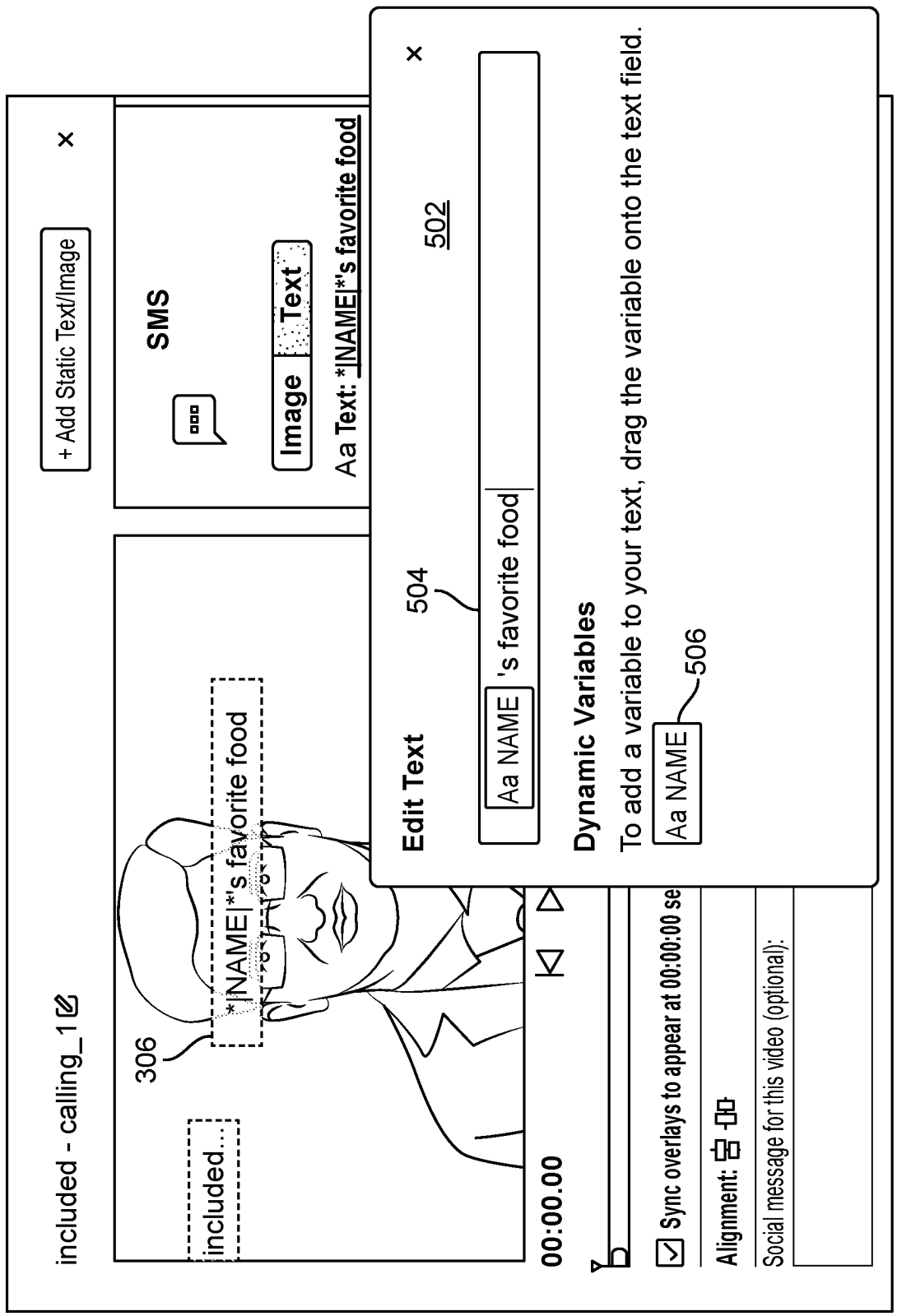
FIG. 5 is an example embodiment of an interface screen for configuring a dynamic text overlay object in a media experience.

FIG. 5 is an example embodiment of an interface screen of a media editor application 162 associated with adding the dynamic text overlay object 306 on a video object 302. The editor has selected an area 502 of the video for adding a text overlay object 306, which causes an edit text interface 502 to display (e.g., as popup window). The edit text interface 502 includes a text box 504 for adding fixed text or for selecting to add a variable. The list of created variables of type "text" may be displayed in a selectable list 506 so that the editor can click on the variable name to add it to the text box 504 in accordance with the appropriate variable notation. In this example, the editor selects the "NAME" variable from the list, which is then populated in the textbox.

Figure 6:
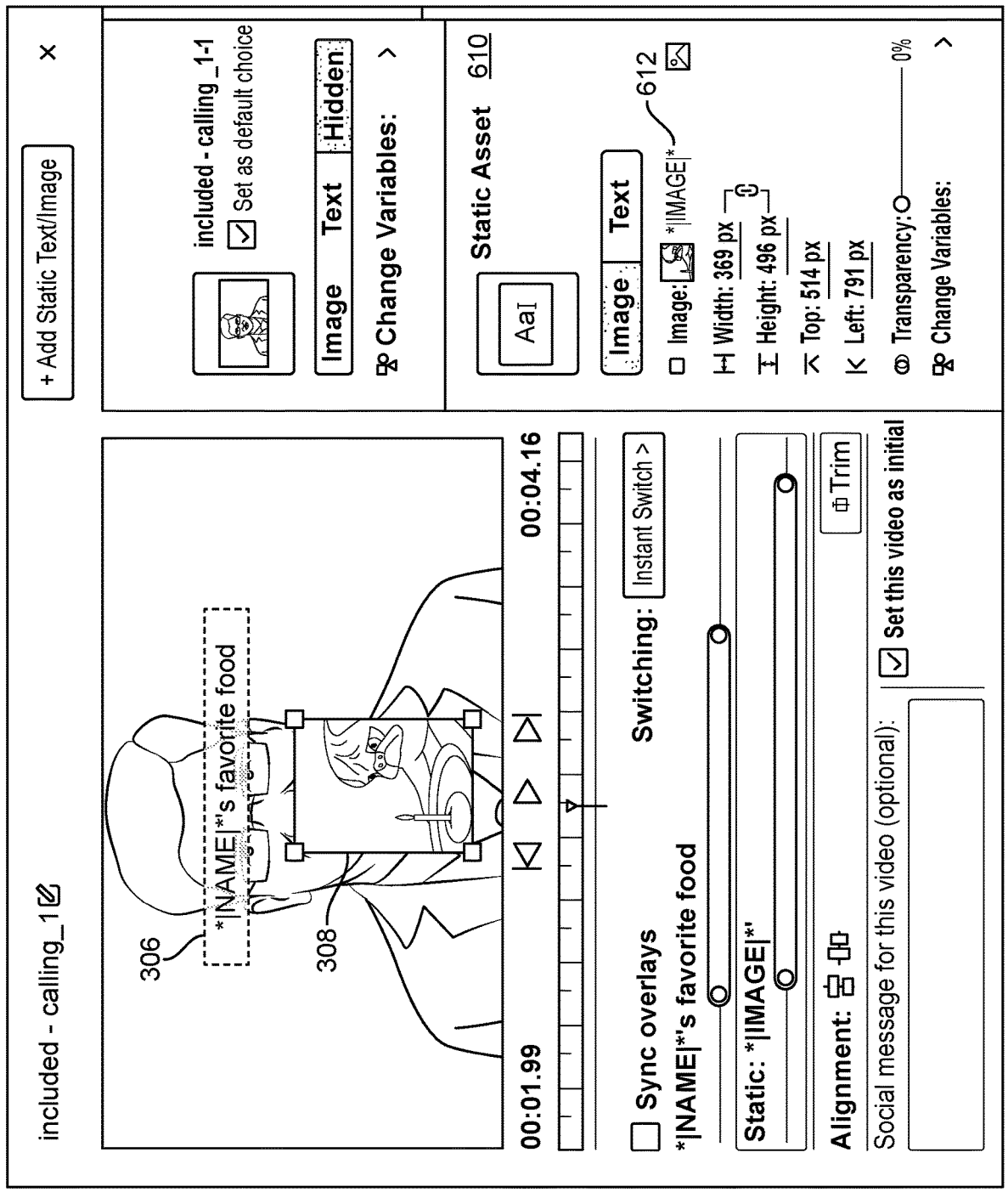
FIG. 6 is an example embodiment of an interface screen for configuring a dynamic image overlay object in a media experience.

FIG. 6 is an example embodiment of an interface screen of a media editor application 162 associated with adding the dynamic image overlay object 308 on a video object 302. An image edit window 610 is displayed that enables configurations of various parameters associated with the image object such as its width, height, position (defined by the top and left edges in this example), a transparency level, etc. The image source 612 is also specified. In this example, the image source 512 is defined using the variable "IMAGE", which can be selected from a list of created variables of the type "image."

Figure 7:
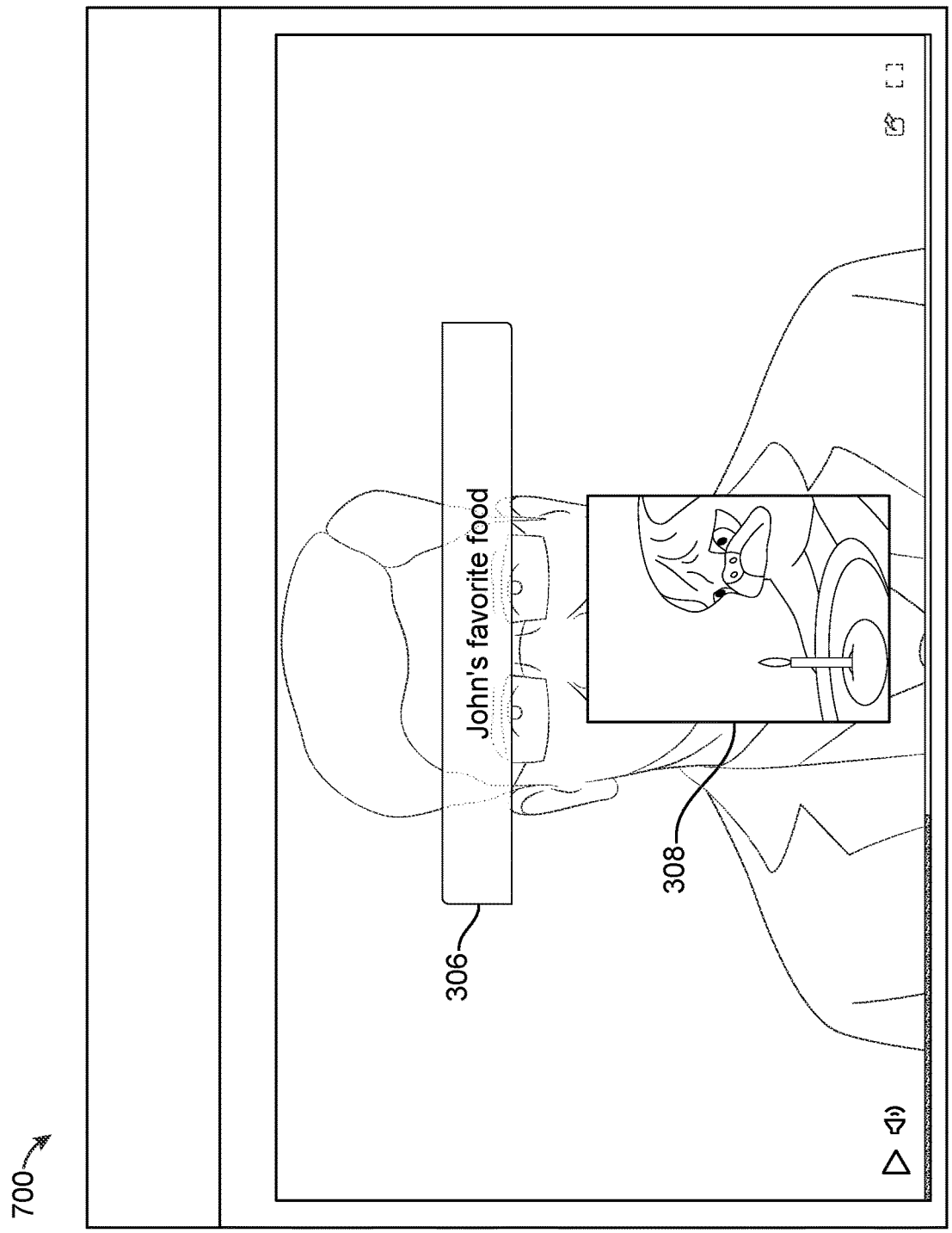
FIG. 7 is an example embodiment of media player application rendering dynamic overlay objects in a media experience.

FIG. 7 is an example video player interface 700 that shows the rendered video at run-time with the text overlay object 306 and the image overlay object 308. Here, the variable portion of the text overlay object 306 ("NAME") is replaced with a value ("Jane") and the image overlay object 308 is rendered based on a custom URL. While FIG. 7 illustrates a simple example, embodiments can include overlays that seamlessly integrate with the underlying video such that it is not necessarily apparent to the viewer that a dynamic overlay is being rendered. For example, a video associated with a shoe retailer, could dynamically overlay an image of a shoe on a display rack of the underlying video or on a model appearing to viewer to be wearing the shoes. The specific shoe can be dynamically changed for different viewers (e.g., based on personal preferences, purchase history, etc.) or based on other dynamic data such as current inventory.

Figure 8:
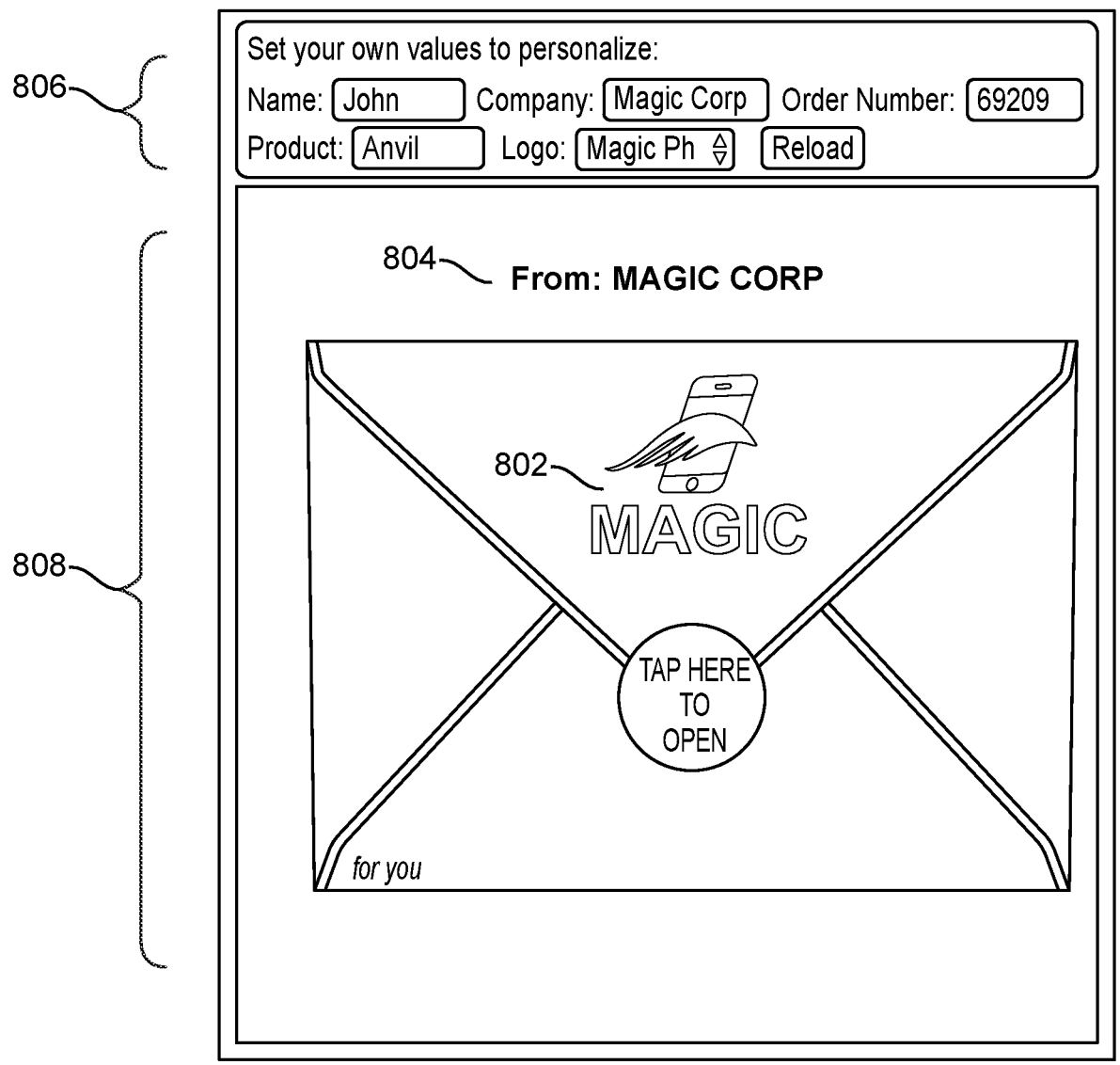
FIG. 8 is another example of an interface for configuring dynamic overlay objects for a custom media experience.

FIG. 8 is another example of an interface for creating a custom media experience using dynamic overlay objects. In this example, the set of configurable variables 806 include text objects such as name, company, order number, and product and includes an image object (logo). The viewing window 808 shows an example frame of an interactive media experience. The experience includes a virtual card that can be opened by the viewer in response to interactions with the card (e.g., clicking on the "open" label). The viewing window 808 provides a preview of the experience at run-time and shows several customized aspects of the interactive media experience including the company name (which appears next to the "from" field) and the company's logo at the top of the envelope. As described above, the customizable image (logo) may be implemented as an overlay object on the underlying content, which can be incorporated in a seamless visual display.

Figure 9:
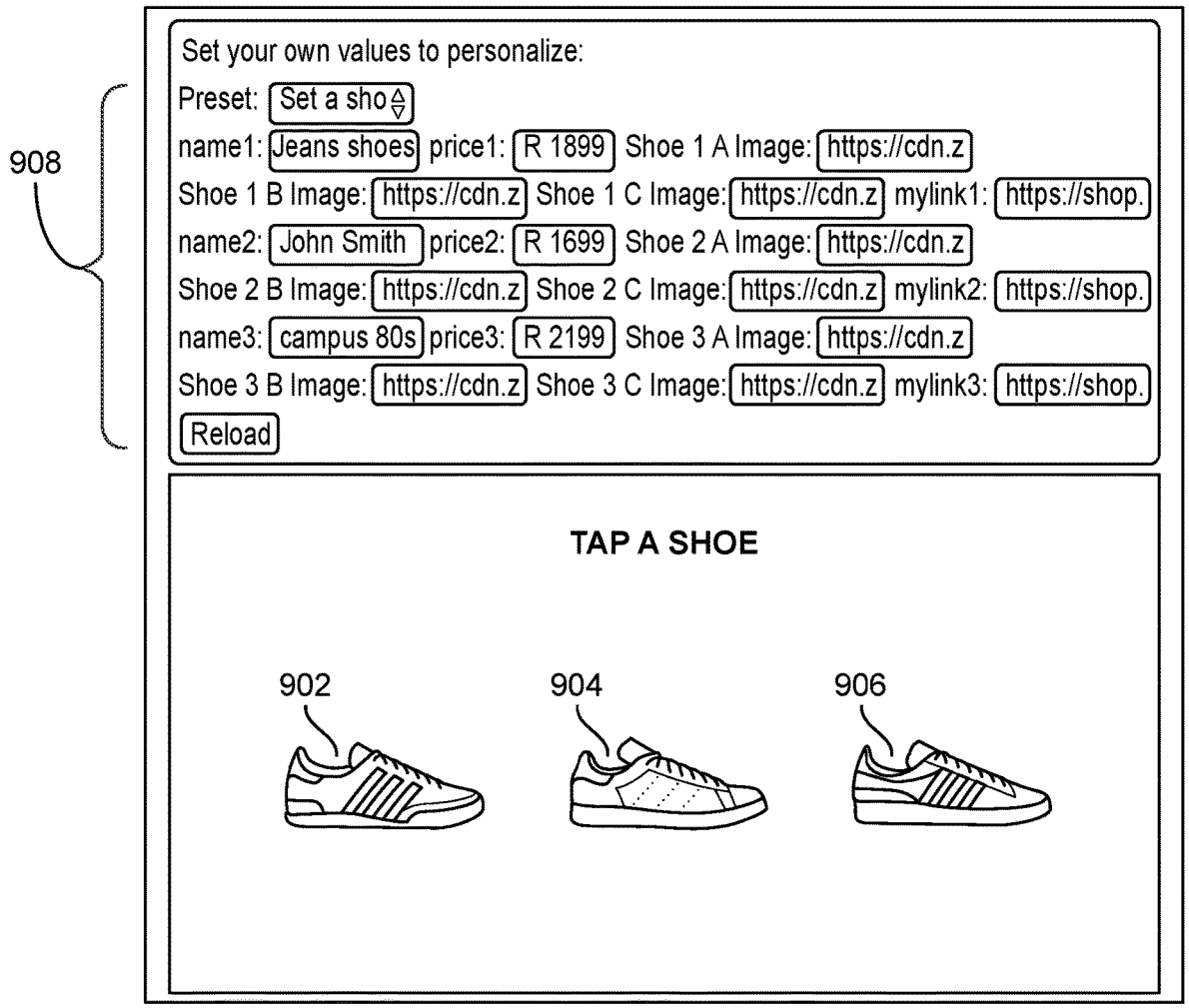
FIG. 9 is another example of an interface for configuring dynamic overlay objects for a custom media experience.

FIG. 9 is another example of an interface for creating a custom media experience using dynamic overlay objects. In this example, the set of configurable variables 908 include text and image objects associated with display of three different shoes 902, 904, 906. In this example, the web server 170 may configured the variables 908 based on their current inventory, based on current promotions, based on tracking data associated with the user (e.g., products that the user recently viewed), or any other criteria. The dynamically selected shoe images 902, 904, 906 may be seamlessly integrated into the media experience without it necessarily being apparent to the viewer that the different shoes 902, 904, 906 are dynamically selected.

Figure 10:
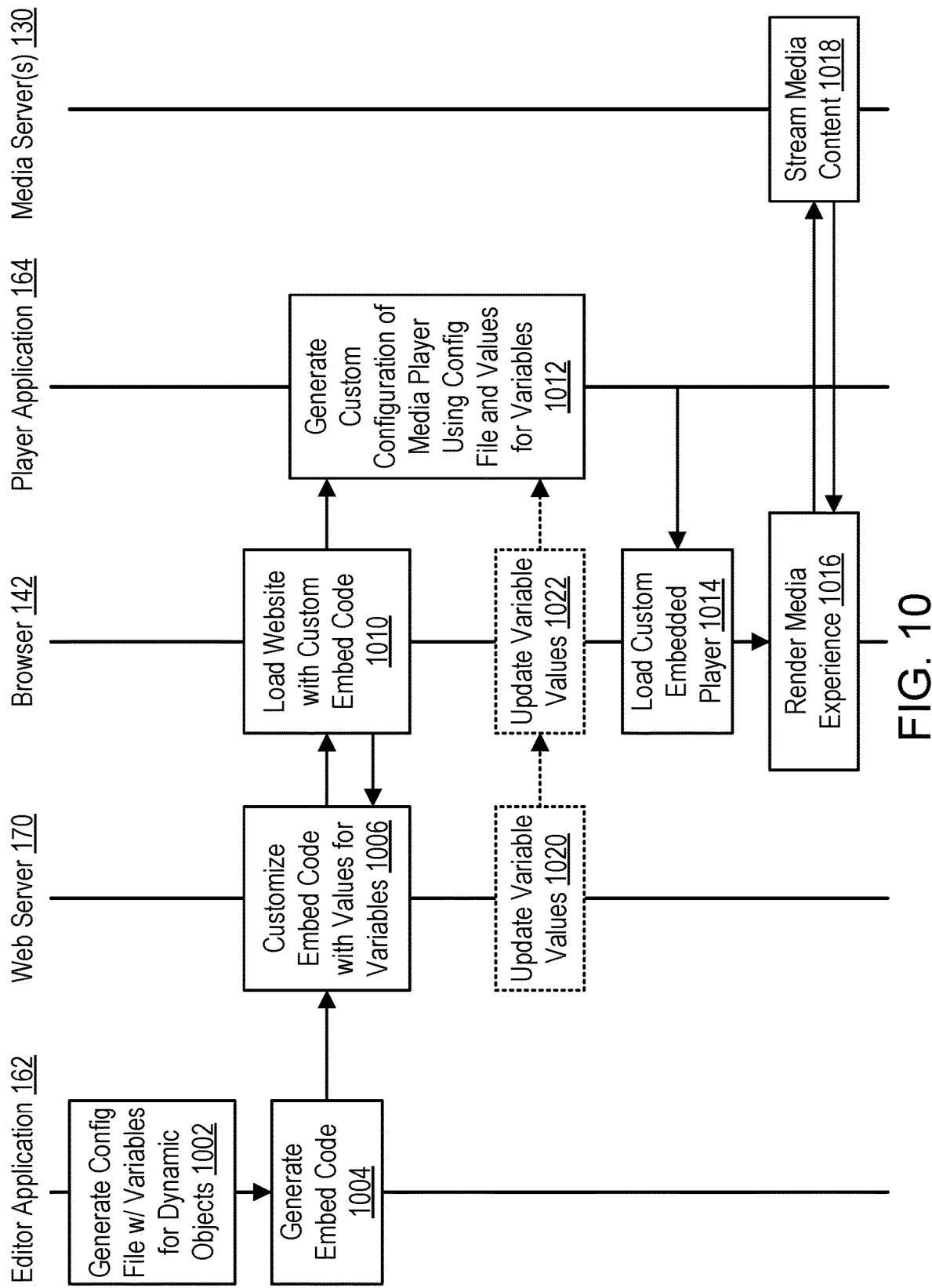
FIG. 10 is an example embodiment of process for generating and presenting a media experience with dynamic overlays.

FIG. 10 is flowchart illustrating an example embodiment of a process for presenting personalized media content based on dynamic data sources. An editor application 162 generates 1002 a configuration file associated with a media experience based on inputs from a creator (e.g., using a graphical and/or text-based interface). The configuration file may specify one or more variables associated with dynamic objects to be configured at run-time. The editor application 162 furthermore generates 1004 an embed code associated with the configuration file that a website publisher may embed in the source code of the website. The embed code may comprise, for example, hypertext transfer markup language (HTML) code, Hypertext Preprocessor (PHP) code, and/or javascript or other embeddable script. The embed code may further specify one or more variables that can be replaced by values in any manner determined by the web server 170. For example, an HTML embed code could be in the form:

<iframe src=https://playerurl.io/ID?custom-name=REPLACE&custom-imagevar=REPLACE"/> where "https://playerurl.io" represents the URL associated with the media experience, "custom-name" and "custom-imagevar" are URL parameters representing the variables to be replaced with values in the configuration file, and "REPLACE" is placeholder text that may be replaced by the web server 170 with the desired values for the variables.

In another example, the embed code could comprise a script language such as PHP (or any other programming language) For example, the embed code could be in the form:

<iframe src=https://playerurl.io/ID?custom-name=<?php echo $username; ?>&custom-imagevar=<?php echo $image_url; ?>"/>

In this example, the embed code will set the variables based on values assigned to the PHP variables $username and $image_url.

In another example, a javascript code may be used in the form:

<script>
    var username="Joe";
    player. setVar ('name', username);
    </script>

In this example, the javascript code uses a post-message to assign the javascript variable "username" (in this example, set to "Joe") to the player variable "name" used by the media player application 164.

The web server 170 customizes 1006 the embed code by assigning values to the embed code variables based on a set of website-specific mapping rules employed by the web server 170. The customization may occur prior to a user accessing the website (e.g., based on data sources accessible to the web server 170) and/or upon a browser 142 loading 1010 the website (e.g., based on user-specific data obtained from the browser 142). The mapping rules specify a mapping between fields in an available data source and the embed code variables. For example, in one embodiment, the web server 170 may set the variables based on web cookie data obtained from a client 140 accessing the website hosted by the web server 160. Here, the web server 170 may parse user data from the web cookie and apply a predefined mapping from the web cookie data fields to the variables in the embed code. In this way, the embed code becomes customized to the user accessing the website. For example, applying this technique to the example HTML embed code above, the web server 170 may update the embed code as follows:

<iframe src=https://playerurl.io/ID?custom-name=Joe&custom-imagevar=http://www.myimages.com/image.jpg"/> where the web server 170 may execute code that substitutes the "REPLACE" placeholder text with the respective strings "Joe" and "http://www.myimages.com/image.jpg" based on mapped fields in the web cookie data. In other examples, the web server 170 may use this technique to customize embed code variables corresponding to the user's name, location, age, preferences, or other information available via the web cookie that is mapped to variables in the embed code. In another embodiment, the web server 170 may set the embed code variables based on a predefined mapping from user profile data fields (from a user profile database accessible to the web server 170) and the embed code variables. Here, the user may be identified based on user credentials expressly provided by the user (e.g., via a web page form) without necessarily using web cookies.

In another embodiment, the web server 170 may set the embed code variables based on a predefined mapping from fields in a database accessible to the web server 170 that may be associated with the website host and is not necessarily user-specific. For example, a website associated with a retailer may map fields from a product database that stores text, images, or other media content associated with specific products. In this way, the media experience can be dynamically customized based on current product information. In further embodiments, the mapping rules may set the embed code variables by mapping fields to the embed code variables from a public data source accessible to the web server 170. In further embodiments, the mapping rules may set the embed code variables using a script that does not necessarily require accessing a database. For example, the script could hardcode the values for the variables or could set the values based on some function.

The browser 142 loads 1010 the customized embed code and upon executing the embed code, sends the embed code parameters specifying the values for the variables to the player application 164. The player application 164 obtains and translates the configuration file together with the customized values for the variables to generate 1012 a customized configuration for the player application 164 for streaming the custom media experience. The browser 142 loads 1014 the player application with the customized media experience and renders 1016 the media experience. Here, the browser 142 may interact with one or more media servers 130 that stream media content 1018 to the browser 142 in accordance with the customized configuration file.

While the media experience is playing, the web server 170 may optionally update 1020 the variable values and send the updated values to the player application 164 (e.g., using a post message). For example, the web server 170 may update values responsive to inputs received from the user on the website outside of the player application 164, updates made to dynamic data sources accessible to the web server 170, or based on other triggering factors that may be configured at the web server 170. Responsive to such updates, the web server 170 may provide updates to the browser 142 via the web page (using a post message), which updates configuration data of the media player application 164 to enable the media experience to be re-customized in accordance with the updated variables. In further embodiments, the browser 142 can directly update 1022 the variables in the configuration of the player application 164 based on user interactions with the player application 164 or other actions on the client device 140.

In another embodiment, the values for the embed code parameters are not necessarily sent when the website initially loads, and may instead be sent via an API request after the browser initially loads the website. For example, javascript code (or other code) may generate post messages to the player application 162 that specify the values for the variables, based on interactions received from the user, based on web cookie data, or based on other data sources.

Upon reading this disclosure, those of skill in the art will appreciate still additional alternative structural and functional designs for the described embodiments as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the embodiments disclosed herein without departing from the scope defined in the appended claims.

The invention claimed is:

1. A method for facilitating presentation of a personalized media experience, the method comprising:
generating, via an editor application, a configuration file specifying instructions for presenting the personalized media experience, the instructions including one or more variables associated with one or more dynamic objects for inclusion in the personalized media experience, wherein generating the configuration file comprises receiving inputs via an editor interface for custom creation of a variable, the inputs including a variable name, a type of media object associated with the variable, and a default value for the variable;
generating, via the editor application, a general embed code for embedding a media player in a website for presenting the personalized media experience defined by the configuration file;
receiving values for the one or more variables derived from one or more dynamic data sources;
responsive to receiving the values for the one or more variables, generating a customized configuration of the media player using the configuration file and the values for the one or more variables; and
streaming the personalized media experience via the media player in its customized configuration, wherein the personalized media experience includes the one or more dynamic objects identified by the values for the one or more variables.

2. The method of claim 1, wherein the general embed code includes the one or more variables as parameters of a web address for accessing the media player, and wherein a web server associated with the web address dynamically customizes the general embed code into customized embed code by replacing the one or more variables with values.

3. The method of claim 2, wherein receiving the values comprises:
receiving the parameters of the web address specifying the values in response to a browser of a client executing the customized embed code obtained from the web server.

4. The method of claim 2, wherein the general embed code and the customized embed code comprise at least one of HyperText Markup Language (HTML) code and scripting language code.

5. The method of claim 2, wherein the web server dynamically customizes the general embed code into the customized embed code by:
obtaining a web cookie from a client upon the client accessing the website; and
assigning the values to the one or more variables based on mapping rules for mapping web cookie data from the web cookie to the one or more variables.

6. The method of claim 2, wherein the web server dynamically customizes the general embed code into the customized embed code by:
assigning, by the web server, the values to the one or more variables based on mapping rules for mapping data from a database accessible to the web server hosting a website that embeds the media player to the one or more variables.

7. The method of claim 2, wherein the web server dynamically customizes the general embed code into the customized embed code by:
obtaining application programming interface (API) data from one or more API calls made by the web server hosting a website embedding the media player; and
assigning the values to the one or more variables based on mapping rules for mapping the API data to the one or more variables.

8. The method of claim 1,
wherein the general embed code comprises script code for sending a post message referencing the one or more variables to a media player server associated with the media player, and
wherein receiving the values for the one or more variables comprises receiving, from a web server hosting a website that embeds the media player, a post message to set the values for the one or more variables.

9. The method of claim 1, further comprising:
while streaming the personalized media experience, receiving from a web server hosting a website that embeds the media player, a post message to update the values for the one or more variables and updating configuration data configuring the media player responsive to the post message.

10. The method of claim 1, further comprising:
while streaming the personalized media experience, receiving from a client responsive to a user interaction with the media player, an update to the values for the one or more variables and updating configuration data configuring the media player responsive to the user interaction.

11. The method of claim 1, wherein generating the configuration file comprises:
receiving inputs, via a graphical editor interface, that control placement and relative timing of one or more media objects for presentation during the personalized media experience, including the one or more dynamic objects and one or more static media objects; and
compiling the inputs received via the graphical editor interface to generate the configuration file.

12. The method of claim 1, wherein streaming the personalized media experience comprises:
overlaying the one or more dynamic objects on one or more static objects in accordance with the configuration file.

13. The method of claim 1, wherein the one or more dynamic objects comprises at least one of text, an image, an animation, a video, an audio clip, and a link.

14. A non-transitory computer-readable storage medium storing instructions for facilitating presentation of a personalized media experience, the instructions when executed by a processor causing the processor to perform steps comprising:
generating, via an editor application, a configuration file specifying instructions for presenting the personalized media experience, the instructions including one or more variables associated with one or more dynamic objects for inclusion in the personalized media experience, wherein generating the configuration file comprises receiving inputs via an editor interface for custom creation of a variable, the inputs including a variable name, a type of media object associated with the variable, and a default value for the variable;

generating, via the editor application, a general embed code for embedding a media player in a website for presenting the personalized media experience defined by the configuration file;

receiving values for the one or more variables derived from one or more dynamic data sources;

responsive to receiving the values for the one or more variables, generating a customized configuration of the media player using the configuration file and the values for the one or more variables; and streaming the personalized media experience via the media player in its customized configuration, wherein the personalized media experience includes the one or more dynamic objects identified by the values for the one or more variables.

15. The non-transitory computer-readable storage medium of claim 14, wherein the general embed code includes the one or more variables as parameters of a web address for accessing the media player, and wherein a web server associated with the web address dynamically customizes the general embed code into customized embed code by replacing the one or more variables with values.

16. The non-transitory computer-readable storage medium of claim 15, wherein receiving the values comprises:

receiving the parameters of the web address specifying the values in response to a browser of a client executing the customized embed code obtained from the web server.

17. The non-transitory computer-readable storage medium of claim 15, wherein the general embed code and the customized embed code comprise at least one of Hyper-Text Markup Language (HTML) code and scripting language code.

18. A computer system comprising:
one or more processors; and
a non-transitory computer-readable storage medium storing instructions for facilitating presentation of a personalized media experience, the instructions when executed by the one or more processors causing the one or more processors to perform steps comprising:

generating, via an editor application, a configuration file specifying instructions for presenting the personalized media experience, the instructions including one or more variables associated with one or more dynamic objects for inclusion in the personalized media experience, wherein generating the configuration file comprises receiving inputs via an editor interface for custom creation of a variable, the inputs including a variable name, a type of media object associated with the variable, and a default value for the variable;

generating, via the editor application, a general embed code for embedding a media player in a website for presenting the personalized media experience defined by the configuration file;

receiving values for the one or more variables derived from one or more dynamic data sources;

responsive to receiving the values for the one or more variables, generating a customized configuration of the media player using the configuration file and the values for the one or more variables; and streaming the personalized media experience via the media player in its customized configuration, wherein the personalized media experience includes the one or more dynamic objects identified by the values for the one or more variables.

19. The computer system of claim 18, wherein the general embed code includes the one or more variables as parameters of a web address for accessing the media player, and wherein a web server associated with the web address dynamically customizes the general embed code into customized embed code by replacing the one or more variables with values.

* * * * *